(12) United States Patent
Somoye et al.

(10) Patent No.: US 12,566,553 B1
(45) Date of Patent: Mar. 3, 2026

(54) NON-VOLATILE PROCESSOR CIRCUIT

(71) Applicant: Two Six Labs, LLC, Arlington, VA (US)

(72) Inventors: Idris Somoye, Silver Spring, MD (US); Kevin Yang, Arlington, VA (US)

(73) Assignee: Two Six Labs, LLC, Arlington, VA (US)

( * ) Notice: Subject to any disclaimer, the term of this patent is extended or adjusted under 35 U.S.C. 154(b) by 63 days.

(21) Appl. No.: 18/437,516

(22) Filed: Feb. 9, 2024

(51) Int. Cl.
*G06F 3/00* (2006.01)
*G06F 3/06* (2006.01)

(52) U.S. Cl.
CPC .......... G06F 3/0619 (2013.01); G06F 3/0634 (2013.01); G06F 3/0679 (2013.01)

(58) Field of Classification Search
CPC ....... G11C 16/225; G11C 5/14; G11C 11/005; G11C 11/4072; G11C 11/4074; G11C 11/413; G11C 13/003; G11C 13/004; G11C 13/0069; G11C 16/10; G11C 2213/77; G11C 5/04; G11C 5/148
See application file for complete search history.

(56) References Cited

U.S. PATENT DOCUMENTS 11,354,098 B2 * 6/2022 Wang ..................... G06F 7/523

* cited by examiner

*Primary Examiner* — Thong Q Le
(74) *Attorney, Agent, or Firm* — Armis IP Law, LLC

(57) ABSTRACT

A non-volatile flip flop (NVFF) incorporates a non-volatile bit into important registers and memory structures to allow a processing state to be resumed after a power down without the need to reboot or write state data to disk. An intermittent computing device, designed for periodic, rather than constant, operation, can benefit by avoiding the need to incur a formal shutdown and writing of data to disk or non-volatile memory. Similarly, no boot or reading of state data need occur when a subsequent intermittent computing cycle occurs. Flip-flop structures that store data bits employ the NVFF capability, typically amounting to around 20% of the total number of gates in the intermittent computing device. Accordingly, the number of power consuming elements is only modestly increased, and savings achieved by avoiding the need to write state data to disk or non-volatile memory.

17 Claims, 5 Drawing Sheets

NON-VOLATILE PROCESSOR CIRCUIT

BACKGROUND

Processor based devices typically undergo an initialization or "boot" cycle upon power-up to commence operation. The boot cycle is a predetermined set of instructions to establish an operational state of the computing device, and may include loading instructions and data into memory, establishing peripheral interfaces, and launching an operating system (OS) or similar program that directs the task or tasks that the processor device was designed for. The boot cycle is commenced each time the processor is powered up. If power is interrupted, even slightly, the boot process needs to be commenced for restarting the processor device.

SUMMARY

A non-volatile flip flop (NVFF) incorporates a non-volatile bit into important registers and memory structures to allow a processing state to be resumed after a power down without the need to reboot or read and write state data to/from disk. An intermittent computing device, designed for periodic, rather than constant, operation, can benefit by avoiding the need to incur a formal shutdown and writing of data to disk or non-volatile memory. Similarly, no boot or reading of state data need occur when a subsequent intermittent computing cycle occurs. Flip-flop elements that employ the NVFF capability typically amount to only around 20% of the total number of gates in the intermittent computing device. Accordingly, the number of power consuming elements is only modestly increased, and savings achieved by avoiding the need to write state data to disk or non-volatile memory.

Configurations herein are based, in part, on the observation that computing devices undergo a boot process at power on to initialize the memory and processor structures, and commence an operating system or similar logic or instruction set. Many computing devices are powered on for long periods, and the boot process, even if lengthy, is infrequent. Unfortunately, conventional approaches to processor operation suffer from the shortcoming that intermittent computing devices, which are invoked only periodically, encounter a disproportionate burden of power-on or boot sequences, which must be incurred at each computing interval. Accordingly, configurations herein substantially overcome the shortcomings of conventional approaches by providing a non-volatile flip flop which retains its value even during power down. Upon power restoration, as defined by an interval governing the intermittent computing task, each NVFF resumes its non-volatile value (state), allowing processing to continue as if the power was never interrupted, and avoiding the overhead incurred in writing out and restoring data with an external storage device.

Conventional approaches to intermittent computing, defined as computing devices which are periodically invoked for gathering data, performing integrity or security checks, or tending to tasks that need not be continually monitored, typically write out important registers and memory values to a disk or other non-volatile memory, and read the data back in as part of the power-on boot cycle. One current solutions to power intermittence is to have a large battery bank and upon a power loss, complete numerous operations to store important articles of the processor state in off chip non-volatile memory. The claimed approach avoids the need for repetitive save and restore cycles by simply halting operation with NVFFs which resume seamlessly upon power restoration, and therefore are not burdened with additional power demand for the shutdown, startup and reboot iterations.

In further detail, configurations herein provide an integrated circuit including a plurality of flip flops, such that each flip flop in the IC (Integrated Circuit) has a logic input, a data input, and a non-volatile bit connected between the data input and the logic input, such that the non volatile bit responsive to a power loss signal. The non-volatile bit stores a value from the data input when the power loss signal is received, and transfers the value from the non-volatile bit to the logic input upon power restoration.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
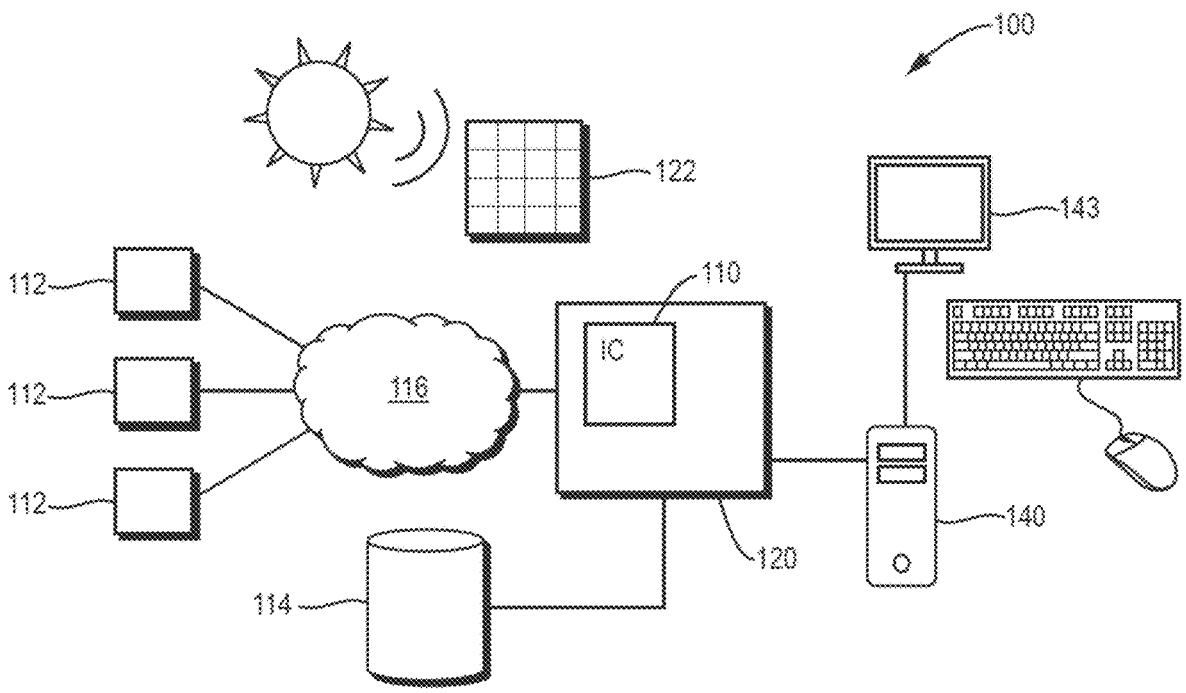
FIG. 1 is a context diagram of an intermittent computing environment suitable for use with configurations herein.

In general, conventional processor state backup strategies are based on an interrupt-based software approach, and perform a "backup" at a sensed shutdown or power loss. Three primary strategies are employed. A threshold-based strategy performs a comparison between the current voltage level and a soft threshold triggers the backup. A periodic strategy allows the processor state to be backed up on set time increments, and in a milestone strategy, the processor state is backed up when a predetermined milestone is reached.

Intermittent computing characterizes a class of processor for systems that are inherently intermittent or periodic as well as systems that operate in low-power domains. For some constant power processors that execute intermittent tasks, the current best practices are to implement wait states in the software until some action is needed. This method is inherently wasteful as power is used for every cycle while the processor is mostly idle. Other solutions to power intermittence are to have a large battery bank and upon a power loss, complete numerous operations to store important articles of the processor state in off chip non-volatile memory, i.e. disk, SSD (solid state drive) or other conventional non-volatile memory structure. Regardless of attempts to streamline the shutdown to make it "graceful," a burden exists in writing our and reading back the relevant data to resume processor operation at or about the state at which the power interruption occurred.

Processor devices, such as microprocessors, Field Programmable Gate Arrays (FPGAs), firmware, and other types of silicon based semiconductor devices all implement an architecture of gates. Configurations herein benefit from the observation that only a subset of the gates are actually flip flops. The flip-flops are the actual hardware structures that "store" information, i.e. a memory bit. The D Flip Flop (DFF) acts as an electronic memory component since the output remains constant unless deliberately changed by altering the state of the D input followed by a rising clock signal. These represent only about 20% of the total gates in a typical processor device. Accordingly, the disclosed approach of implementing a system of NVFFs has only a modest increase in the needed hardware and related circuit footprint. Configurations herein take advantage of lower area overhead to implement a fast-safe shutdown, rapid restart non-volatile processor. This class of processor would also be better secure against side channels attacks during bootup.

A particularly beneficial configuration involves a replacement architecture for a ReRAM (Resistive memory) based device. So-called "hibernate" or "sleep" functions purport to achieve a "warm" start by saving certain information prior to shutdown, and restoring in-process activity to avoid a full boot. Implementation of the NVFF provides an architecture that takes advantage of the lower area overhead NVFF enabled by NiO-based unipolar resistive switching device (ReRAM). Configurations herein may utilize the NVFF to implement a fast-safe shutdown, as well as rapid restart for batteryless and hypersecure boot applications.

FIG. 1 is a context diagram of an intermittent computing environment 100 suitable for use with configurations herein. In the computing environment 100, an intermittent computing device 110 includes an integrated circuit 110 adapted for periodic computing and dormant phases. The dormant phase is an unpowered state where the non-volatile flip-flop (NVFF) of the claimed approach stores the state of the executing system for subsequent power restoration.

The intermittent computing device 110 may suit a variety of uses. In an example configuration, one or more sensors 112 may be periodically read or evaluated for storage in a database 114. The sensors 112 may be remotely located, such as via a public access network 116 such as the Internet. Alternatively, the sensors may be local or even part of the intermittent computing device 120. Power may be provided by any suitable source; one of the advantages of the NVFF is that shutdown and power-up/boot cycles are saved, thus only power for executing an intermittent task is needed. A particular configuration may employ a solar source 122, however alternative sources of even modest power generation may be effective, such as thermoelectric, piezoelectric, wind or other sources.

A modest power generation source complements the intermittent computing because the power source need only generate enough power to satisfy an iteration of the intermittent computing iteration, and need not save and reload or reboot at each intermittent computing iteration. This allows for on-site and remote placement, and optionally for wireless 4G/5G cellular, Bluetooth, WiFi, Zigbee or other transmission medium to convey results, in addition to or as an alternative to the database 114.

A constant computing device or server 140 may be initially or permanently connected, for data gathering and/or firmware/instructions update, through conventional rendering devices 142 and UI (user interface) peripherals such as keyboards 144. Power demands may also be sought from a battery, however a proposed configuration is to maintain the intermittent computing device 120 in a self-sustaining manner to draw just enough power from the available sources to satisfy the next iteration of intermittent computing.

Figure 2:
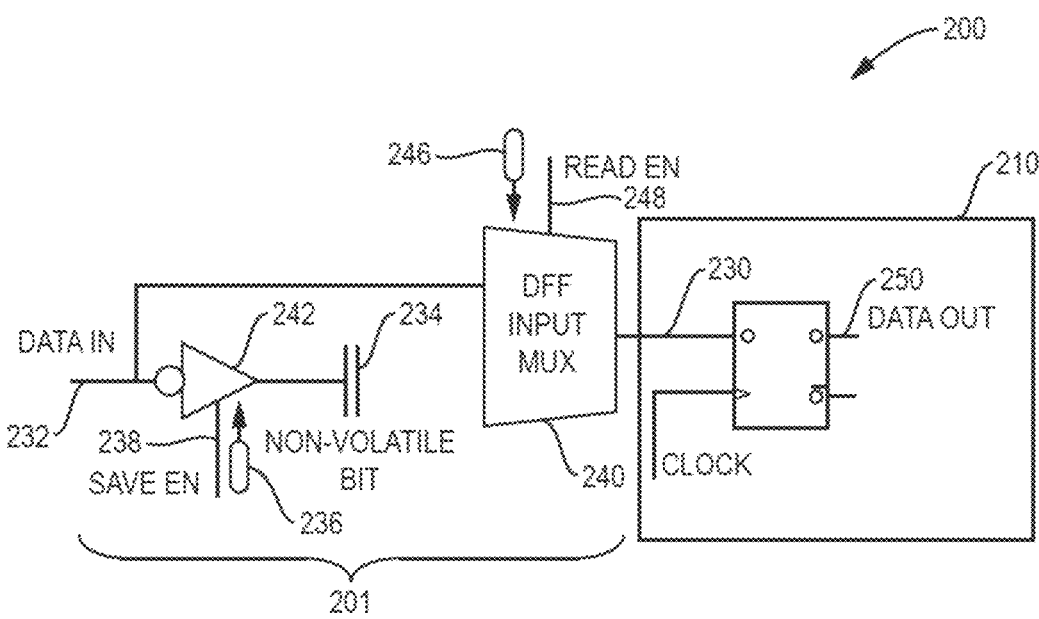
FIG. 2 is a block diagram of a non-volatile flip flop (NVFF) in the environment of FIG. 1.

FIG. 2 is a block diagram of a non-volatile flip flop (NVFF) 200 in the environment of FIG. 1. Referring to FIGS. 1 and 2, the integrated circuit (IC) 110 includes a plurality of gates that implement programmed logic in the form of instructions or opcodes. A flip-flop, or more appropriately a D-Flip flop, is an arrangement of gates that stores a data bit, i.e. a binary digit of 1 or 0, and include only a portion (about 20-30%) of the gates in the IC 110. Only these flip-flop 210 elements need be equipped with the non-volatile bit circuitry 201, in addition to the flip-flop 210.

Among the plurality of flip flops 210 in the IC 110, each NVFF 200 employs a logic input 230, a data input 232, and a non-volatile bit 234 connected between the data input 232 and the logic input 230. In a conventional flip-flop, the data input 232 is the same conductor/contact as the logic input 230 for storing the data (1 or 0) asserted by the data input 232.

The non volatile bit 234 is responsive to a power loss signal 236, Upon a power loss or intermittent computing cycle completion, the non-volatile bit 234 receives the data input 232 in conjunction with the logic input 230. In other words, the NV bit 234 is set by the same data that sets the flip-flop 120.

The non-volatile bit stores the value from the data input 232 in an absence of power when the power loss signal 236 is received. A save enable connection 238 receives the power loss signal 236; more succinctly, the power loss signal 236 occurs by asserting the save enable connection 238. The non-volatile bit 234 stores the value from the data input 232 when the power loss signal 236 is received.

A multiplexer 240 is connected between the data input 232 and the logic input 230, where the multiplexer has a read enable connection 248 for, when asserted, passing the non-volatile bit 234 to the logic input 230. Since the non-volatile bit 234 receives the data input 232 in conjunction with the logic input 230, the non-volatile bit is assured to be storing the asserted value of the flip flop 210 at the time the power loss signal 236 is received.

The read enable connection 248 is asserted upon power restoration for defining the providing the read enable signal 246 wherein a value of the non-volatile bit 234 is read by the logic input 230 when the power is restored. An inverter 242 between the data input 232 and the non-volatile bit 234 stores the non-volatile bit for subsequent inversion by the multiplexer 240 upon assertion of the read enable connection 248. The non-volatile bit 234 is therefore adapted to transfer the value from the non-volatile bit 234 to the logic input 230 upon power restoration, and subsequently to the data output 250 of the flip-flop 210 for restoring the value asserted by the flip-flip 210 at power shutdown.

For the system defined by the IC 110 and the intermittent computing device 120, providing the non-volatile bit circuitry 201 on each of the plurality of flip flops in the IC 110 ensures that the save enable connections 238 receive the power loss signal simultaneously, causing all the non-volatile bits 234 of each of the NVFFs to store and resume their values between power on/off cycles. In particular configurations, the device 200 further includes an intermittent computing circuit, such that the intermittent computing circuit periodically switches power to the integrated circuit by issuing the power loss signal 236 and subsequent power restoration in response to a predetermined iteration schedule.

Figure 3:
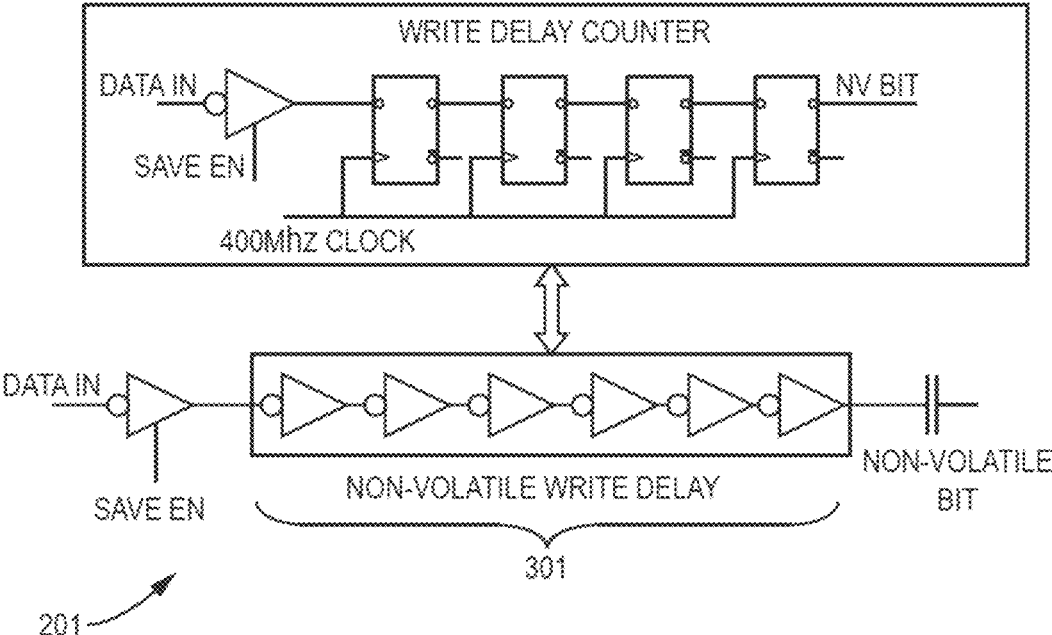
FIG. 3 is a block diagram of a delay circuit in the NVFF of FIG. 2.

FIG. 3 is a block diagram of a delay circuit in the NVFF of FIG. 2. Referring to FIGS. 1-3, a difference in read and write times may occur between the NVFF and the IC 110. In a typical resistive memory, or ReRam, the write time is around 7 ns and the read time is around 10 ns. A counter delay 301 may be implemented in the NVFF circuit 201 to impose a delay between the data input and the non-volatile bit to accommodate a read/write timing difference.

A further enhancement may incorporate a distributed charge pump for accommodating a voltage difference between the save enable signal and the data input signal. The data input signal 232 and save enable connection 238 typically operates at around 1.8 VDC, while the non-volatile bit 234 may expect around 2.0 VDC.

Figure 4:
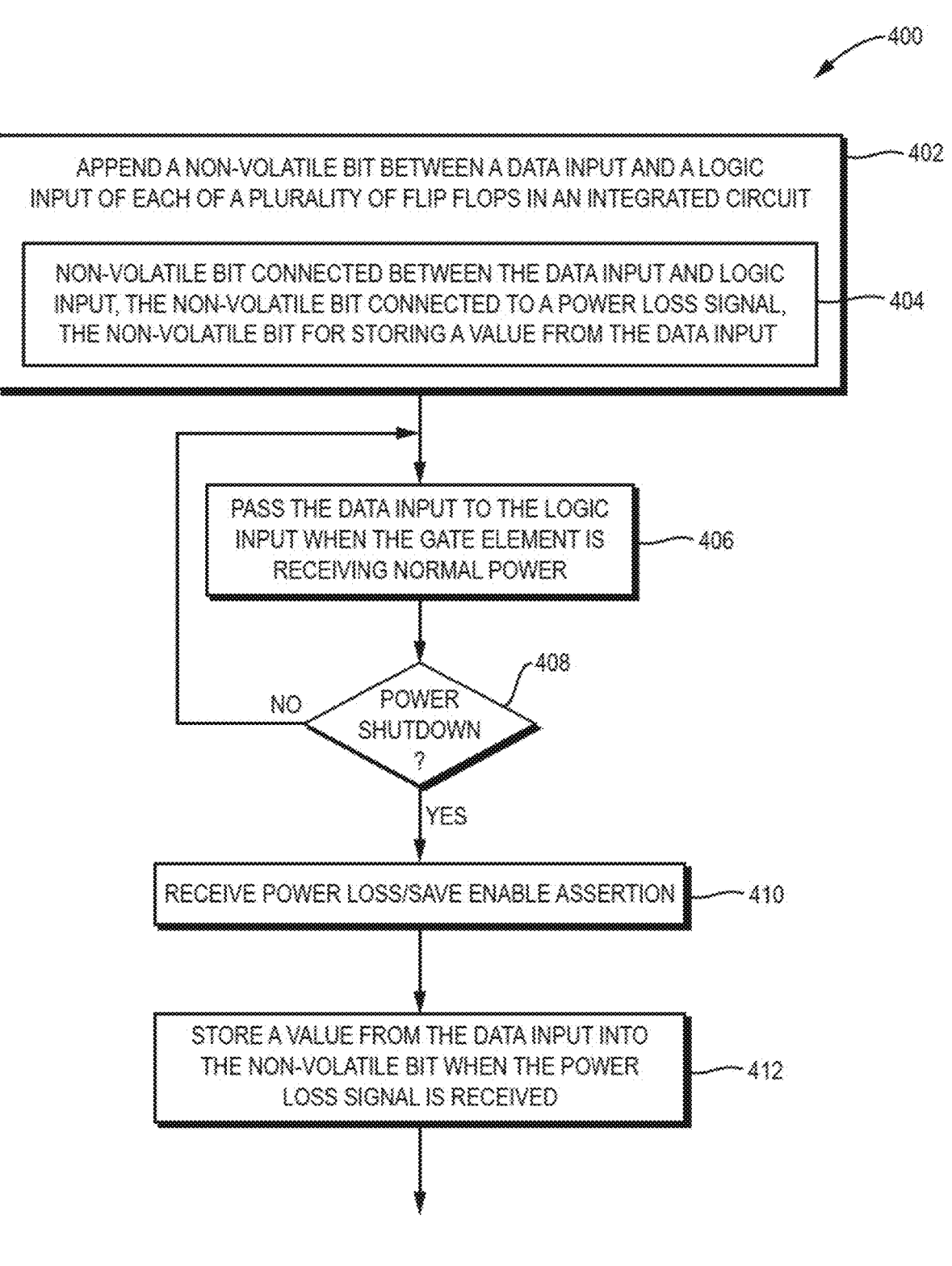
FIG. 4 is a flowchart of operation of an intermittent computing device using the NVFF of FIGS. 1-3.
Figure 4:
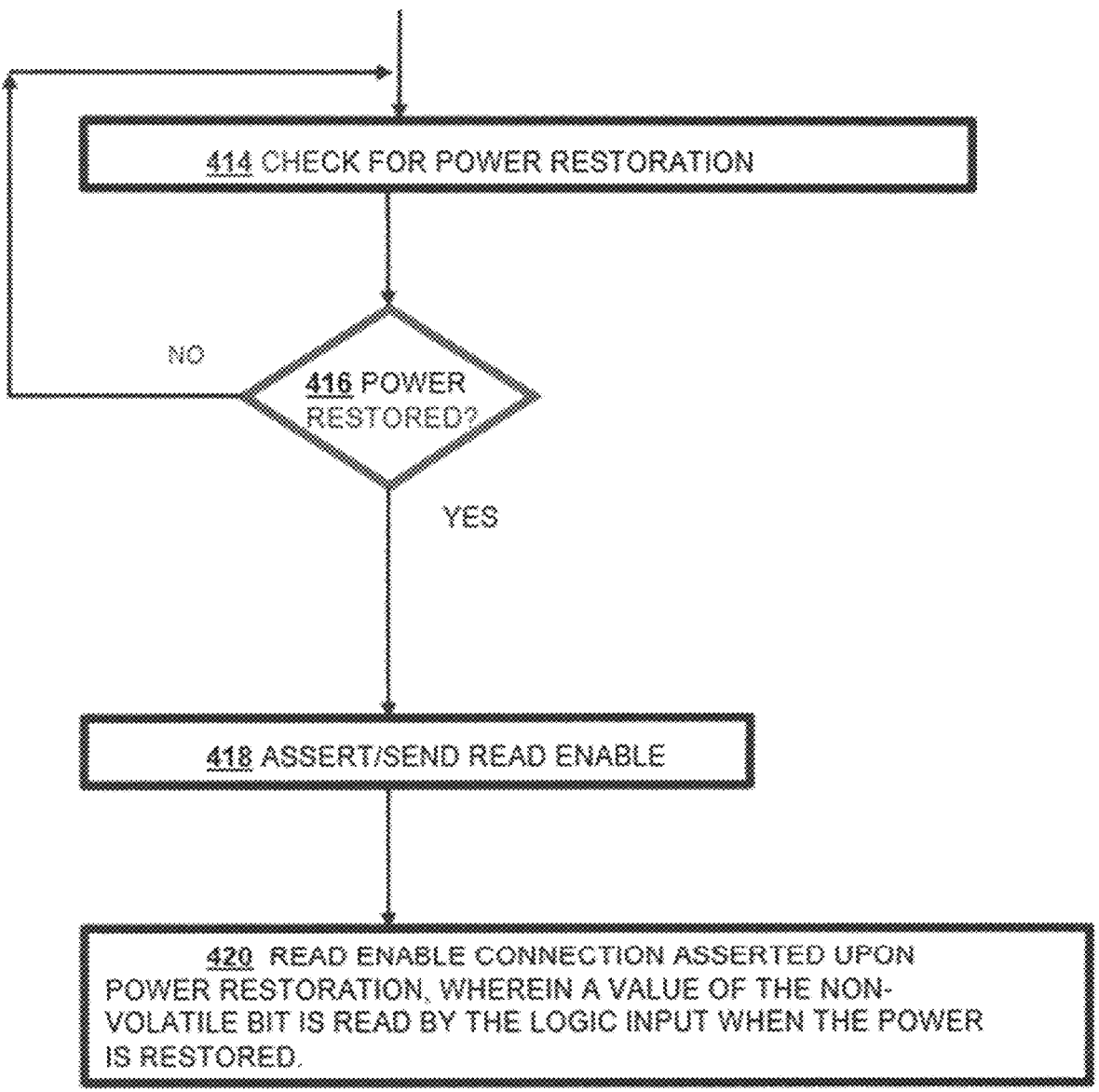

FIG. 4 is a flowchart 400 of operation of an intermittent computing device using the NVFF of FIGS. 1-3. Referring to FIGS. 1-4, at step 402, a processor architecture appends a non-volatile bit between a data input 232 and a logic input 230 of each of a plurality of flip flops 210 in an integrated circuit 110. In a particular approach, the non-volatile bit is connected between the data input and the logic input, and the non volatile bit connected to a power loss signal, where the non-volatile bit 234 stores a value from the data input 232, as depicted at step 404.

The IC 110 may be any suitable IC having flip flops as at least a portion of the hardware architecture. Ensuring that each of the flip flops has a non-volatile bit 234, forming an NVFF 200 as defined herein, assures that the processing state is preserved by the NV bits 234, allowing the read enable to simply continue the previous state (value) of each NVFF based on collective, respective NV bits 234.

During powered-up iteration, the non-volatile bit circuitry 201 passes the data input 232 to the logic input 230 when the NVFF (gate element) 200 is receiving normal power, as depicted at step 406. In effect, the NV bit circuitry 201 is simply a pass-through entity when not called upon for non-volatile storage.

A check is performed, at step 408, to determine if a power shutdown has occurred, and if so, the power loss signal 236 is received, as depicted at step 410. The power loss signal is simply an assertion of the save enable 238 connection, and may be an explicit logic voltage, or simply a lack of power if the save enable signal is low asserted (binary "1" at a low voltage). The latter provides an "automatic" nature as a loss of power and voltage is interpreted as a signal assertion. This may also involve an explicit comparison of input voltage with a predetermined threshold, Responsive to this signal, the non-volatile bit stores a value from the data input 232 when the power loss signal 236 is received, as disclosed at step 412. Following power loas/shutdown, the non-volatile bit in each NVFF effectively preserves the collective state of all flip-flops as of the moment of power loss.

The system remans powered off, with state preserved across the non-volatile bits 234, as depicted at step 414. A check is performed, at step 416, for power restoration, or other commencement of the intermittent computing interval. Upon power restoration at step 418, the read enable connection 248 is asserted, defining the read enable signal 246. Upon power restoration, a value of the non-volatile bit is read by the logic input 230 when the power is restored, as depicted at step 420. This causes the multiplexer 240 to look to the non-volatile bit 234 to pass to the logic input 230, rather than the data input 232 for startup.

When the all the D-flip-flops in the circuit, board, processor, FPGA or other processing element, and all are interconnected to recognize the read enable 248, the power on causes each flip flop to look to the respective non-volatile bit 234 to set the flip-flop 210 value, thus attaining the same collective state (binary value) at the time the power was shut down.

Figure 5:
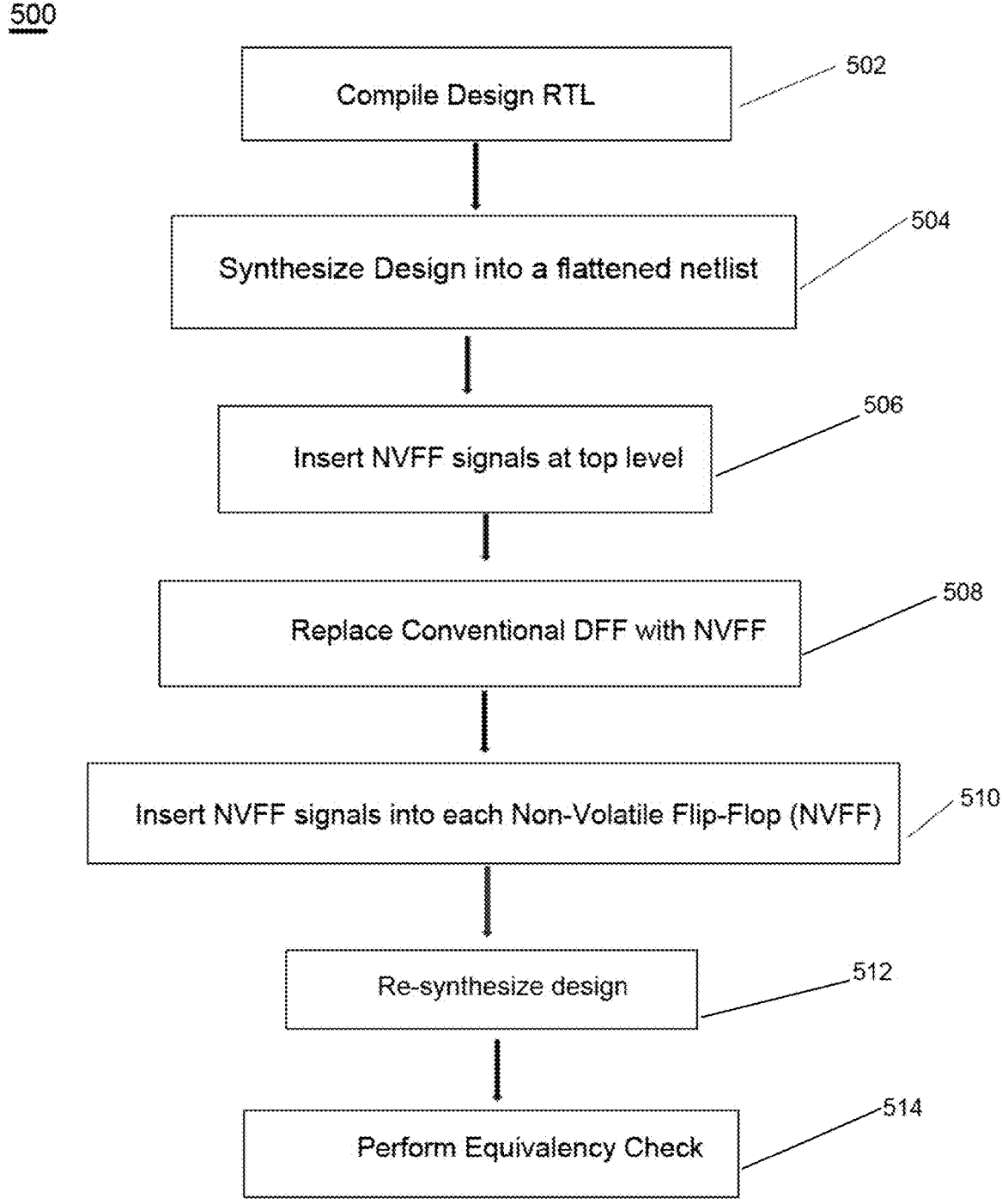
FIG. 5 is a flowchart for NVFF implementation or conversion of a conventional circuit design.

The benefits of the disclosed approach are particularly apparent in a design upgrade of a conventional flip-flop circuit. The net result, as indicated above, requires only a modest increase in size for implementing the non-volatile architecture. FIG. 5 is a flowchart for NVFF implementation or conversion of a conventional circuit design. For converting a conventional design into a non-volatile equivalent, FIG. 5 shows a sequence 500 of a specific series of steps to faithfully replicate the functionality of the circuit as an NVFF circuit.

This process may receive a standard ASIC design and traverse the design to generate an NVFF equivalent. An automated cell replacement system (Non-Volatile Converter) converts a conventional design into a non-volatile equivalent. Alternatively, this may represent a manual process of replacing appropriate gates with the NVFF described above. Referring to FIG. 5, at step 502, a standard register-transfer level (RTL) design such as an ASIC (Application Specific Integrated Circuit) is provided.

While conventional logic circuits merely call out AND gates, OR gates, and the like, in modern ASIC design, standard-cell methodology is practiced with a sizable library (or libraries) of cells. The library usually contains multiple implementations of the same logic function, differing in area and speed. At step 504, the Register-Transfer Level (RTL) design is synthesized. This may be performed through the utilization of yosys, an open-source synthesis tool or other suitable utility or toolkit, thereby transforming it into a standard cell netlist. The netlist is the standard-cell representation of an ASIC design, at the logical view level. It consists of instances of the standard-cell library gates, and port connectivity between gates. Proper synthesis techniques ensure mathematical equivalency between the synthesized netlist and original RTL description.

Following this synthesis stage, the system delves into a sophisticated parsing operation, scrutinizing the netlist in granular detail. The conversion inserts NVFF signals at the top level, as depicted at step 506. During this parsing phase, each D Flip-Flop (DFF) cell within the netlist undergoes a replacement process, seamlessly substituted with the disclosed Non-Volatile Flip-Flop (NVFF) 200, as shown at step 508.

Once each D Flip-Flop (DFF) cell within the netlist is replaced with the custom Non-Volatile Flip-Flop (NVFF) 200, NVFF signals are inserted to provide the save enable connection 238 and read enable connection 248, as depicted at step 510. Referring again to FIG. 2, this adds the Save-En, Read-En, read-delay, write-delay, and Power-Rst to the input/output ports of each inserted NVFF in the netlist.

The culmination of these intricate steps results in a netlist that mirrors the functional characteristics of the original design, with the notable exception of the incorporated non-volatile components (recall that only about 20% of components need to incorporate NVFF functionality). The design may be resynthesized, as disclosed at step 512, to codify the NVFF circuit design. An equivalency or validation check at step 514 ensures that the conversion diligently applies constraints to the netlist to safeguard against potential optimizations during synthesis, ensuring that crucial features remain intact and are not inadvertently optimized away. This comprehensive approach underscores the commitment to achieving not only functional equivalence but also a faithful representation of the original design's intricacies during the conversion process.

The result of these steps is a netlist that mirrors the functional characteristics of the original design with the only notable difference being that it now implements the NVFF functionality for non-volatile operation in intermittent computing applications.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A memory circuit, comprising:
a gate element, including
   a logic input;
   a data input;
   a non-volatile bit connected between the data input and the logic input, the non volatile bit connected to a power loss signal, the non-volatile bit storing a value from the data input when the power loss signal is received and adapted to transfer the value from the non-volatile bit to the logic input upon power restoration; and
   a multiplexer, the multiplexer attached between the logic input and the data input and operable to:
      pass the data input to the logic input when the gate element is receiving normal power; and
      pass the non-volatile bit to the logic input upon assertion of a read enable signal indicative of power restoration.

2. The memory circuit of claim 1, wherein the gate element is a flip-flop for storing a logic bit.

3. An integrated circuit, comprising:
a plurality of flip flops, each flip flop having:
a logic input;
a data input;
a non-volatile bit connected between the data input and the logic input, the non volatile bit connected to a power loss signal, the non-volatile bit storing a value from the data input when the power loss signal is received and adapted to transfer the value from the non-volatile bit to the logic input upon power restoration; and
a read enable connection, the read enable connection asserted upon power restoration, wherein a value of the non-volatile bit is read by the logic input when the power is restored.

4. The integrated circuit of claim 3 wherein the non-volatile bit receives the data input in conjunction with the logic input.

5. The integrated circuit of claim 3 wherein the non-volatile bit stores the value from the data input in an absence of power when a power loss signal is received.

6. The integrated circuit of claim 5 wherein the power loss signal is based on a comparison of input voltage falling below a threshold.

7. The integrated circuit of claim 3 further comprising a save enable connection on each of the plurality of flip flops, the save enable connections receiving the power loss signal simultaneously.

8. The integrated circuit of claim 3 further comprising a multiplexer connected between the data input and the logic input, the multiplexer having a read enable connection for, when asserted, passing the non-volatile bit to the logic input.

9. The integrated circuit of claim 8 further comprising an inverter between the data input and the non-volatile bit, the inverter for storing the non-volatile bit for subsequent inversion by the multiplexer upon assertion of the read enable connection.

10. The integrated circuit of claim 3 wherein the integrated circuit is embedded in an intermittent processing environment, the intermittent processing environment having an interval, the integrated circuit periodically issuing the power loss signal followed by the power restoration at each interval.

11. A memory circuit, comprising:
a gate element, including
   a logic input:
   a data input; and
   a non-volatile bit connected between the data input and the logic input, the non volatile bit connected to a power loss signal, the non-volatile bit storing a value from the data input when the power loss signal is received and adapted to transfer the value from the non-volatile bit to the logic input upon power restoration wherein the power loss signal defines a save enable assertion, and a read enable signal transfers the value from the volatile bit to the flip flop via the logic input.

12. The memory circuit of claim 1 wherein less than 25% of the gates in the integrated circuit are flip-flops.

13. The memory circuit of claim 1 further comprising imposing a delay between the data input and the non-volatile bit, the delay accommodating a read/write timing difference.

14. The memory circuit of claim 1 further comprising a distributed charge pump for accommodating a voltage difference between the save enable signal and the data input signal.

15. A method of preserving processor state, comprising:
appending a non-volatile bit between a data input and a logic input of each of a plurality of flip flops in an integrated circuit;
attaching a save enable connection to each respective non-volatile bits of the plurality of flip flops;
attaching a read enable connection to a multiplexer connected between the non-volatile bit and the logic input; and
connecting the read enable connections and the save enable connections to a power input to the integrated circuit, each respective non-volatile bit storing a value from the data input when the power loss signal is received and adapted to transfer the value from the non-volatile bit to the logic input upon power restoration.

16. The method of claim 15 wherein less than 25% of the gates in the integrated circuit are flip-flops.

17. An electronic system, comprising:

an integrated circuit, a plurality of flip flops in the integrated circuit, each flip flop having:

a logic input;

a data input;

a non-volatile bit connected between the data input and the logic input, the non-volatile bit connected to a power loss signal, the non-volatile bit storing a value from the data input when the power loss signal is received and adapted to transfer the value from the non-volatile bit to the logic input upon power restoration; and an intermittent computing circuit, the intermittent computing circuit periodically switching power to the integrated circuit by issuing the power loss signal and subsequent power restoration in response to a predetermined iteration schedule.

* * * * *